US010006650B2

(12) United States Patent
Kim

(10) Patent No.: US 10,006,650 B2
(45) Date of Patent: Jun. 26, 2018

(54) ENERGY-SAVED SMART SAFETY COOLING/WARMING WIND APPARATUS FOR THE FOUR SEASONS

(71) Applicant: Kwang Soo Kim, Seoul (KR)

(72) Inventor: Kwang Soo Kim, Seoul (KR)

( * ) Notice: Subject to any disclaimer, the term of this patent is extended or adjusted under 35 U.S.C. 154(b) by 471 days.

(21) Appl. No.: 14/426,426

(22) PCT Filed: Feb. 24, 2014

(86) PCT No.: PCT/KR2014/001470
§ 371 (c)(1),
(2) Date: Mar. 6, 2015

(87) PCT Pub. No.: WO2014/204081
PCT Pub. Date: Dec. 24, 2014

(65) Prior Publication Data
US 2015/0241072 A1    Aug. 27, 2015

(30) Foreign Application Priority Data
Jun. 19, 2013  (KR) .................. 10-2013-0070526

(51) Int. Cl.
*F24F 11/00*   (2018.01)
*F24F 5/00*   (2006.01)
(Continued)

(52) U.S. Cl.
CPC .............. *F24F 5/0017* (2013.01); *F24F 3/14* (2013.01); *F24F 6/00* (2013.01); *F24F 11/0008* (2013.01);
(Continued)

(58) Field of Classification Search
CPC .... F24F 1/02; F24F 3/14; F24F 5/0017; F24F 6/00; F24F 11/0008
See application file for complete search history.

(56) References Cited

U.S. PATENT DOCUMENTS 3,869,529 A * 3/1975 Follette ................. F24F 3/14
                                                        236/44 C
4,090,370 A * 5/1978 Vaughan ............... F24F 3/14
                                                        236/44 C
(Continued)

FOREIGN PATENT DOCUMENTS

| EP | 2090842 | 8/2009 |
|---|---|---|
| JP | 2009-103373 | 5/2009 |
| KR | 10-2001-0028976 | 4/2001 |

OTHER PUBLICATIONS

International Search Report dated May 19, 2014 for PCT/KR2014/001470.
(Continued)

*Primary Examiner* — Jonathan Bradford

(57) ABSTRACT

An air blower enables cold-air dehumidification by removing moisture in summer, can supply instantaneous hot air when the room temperature temporarily goes down, enables hot-air humidification by supplying moisture in winter, enables a four-season use by using an additional humidification function in spring and fall, controls room temperature and room humidity by providing an indoor temperature/humidity sensor and a water temperature sensor, saves energy by intelligently operating and stopping all the functions, provides warning signs through lamps for indicating supply or discharge or lack of water with a high/low water level gauge of a water tank and a high water level gauge of a water tank for dehumidification, prevents safety accidents such as damage or conflagration and the like of components related to a fan driving motor by providing a fan driving motor overheating prevention sensor, prevents the leakage of water when a main body falls down.

15 Claims, 12 Drawing Sheets

(51) Int. Cl.
    *F24F 3/14*         (2006.01)
    *F24F 6/00*         (2006.01)
    *F24F 11/89*       (2018.01)
    *F24F 1/02*         (2011.01)

(52) U.S. Cl.
    CPC ............... *F24F 11/89* (2018.01); *F24F 1/02* (2013.01); *F24F 2005/0025* (2013.01); *F24F 2221/54* (2013.01); *Y02E 60/147* (2013.01)

(56) References Cited

U.S. PATENT DOCUMENTS

| | | | | |
|---|---|---|---|---|
| 4,428,207 | A * | 1/1984 | Hall | F24F 3/153 |
| | | | | 236/44 R |
| 4,520,864 | A * | 6/1985 | Katagiri | F24F 1/02 |
| | | | | 165/60 |
| 5,188,169 | A * | 2/1993 | Lim | F24F 3/153 |
| | | | | 165/122 |
| 5,445,214 | A * | 8/1995 | Han | F24F 5/0035 |
| | | | | 165/11.1 |
| 2010/0127089 | A1* | 5/2010 | Sakami | F24F 3/14 |
| | | | | 236/44 C |

OTHER PUBLICATIONS

Written Opinion of the International Search Report dated May 19, 2014 for PCT/KR2014/001470.

* cited by examiner

< Prior Art >

Replacement Sheet
6/12

Replacement Sheet
8/12

ENERGY-SAVED SMART SAFETY COOLING/WARMING WIND APPARATUS FOR THE FOUR SEASONS

This application claims the priority of Korean Patent Application No. 10-2013-0070526, filed on Jun. 19, 2013 in the KIPO (Korean Intellectual Property Office), the disclosure of which is incorporated herein entirely by reference. Further, this application is the National Stage application of International Application No. PCT/KR2014/001470, filed Feb. 24, 2014, which designates the United States and was published in Korean. Each of these applications is hereby incorporated by reference in their entirety into the present application.

TECHNICAL FIELD

The present invention is related to providing an air conditioner, and in particular an energy-saved smart safety cooling/warming wind apparatus for the four seasons for enabling the cooling dehumidification to remove the wetness in an indoor in summer and/or supplying an instant warming wind for a while upon the temporary dropping down of an indoor temperature, an warming wind humidification supplying the wetness to the indoor when used in winter and a separate humidification when used in spring and fall, thereby allowing a system to use in the four seasons as well as allowing an indoor temperature/humidification sensors to enable the control of the temperature and humidity of the indoor. The energy-saved smart safety cooling/warming wind apparatus for the four seasons comprises indoor temperature/humidity sensors provided to enable the control of the indoor temperature and humidity and the comparison of the temperature and humidity detected by the indoor temperature/humidity sensors with a predetermined temperature and humidity previously set on an indication window of a control box, thereby allowing these schematic functions to be automatically performed in connection with the intermittent and repeated operating like the artificial and intelligent operation and stop, thereby saving the energy. The energy-saved smart safety cooling/warming wind apparatus for the four seasons further comprises high-low water level gauges in a water tank and another high water level gauge in a dehumidification water tank to provide a warning indication through a lamp upon water supply, drain or shortage, thereby enhancing the convenience in respect of use, and an over-heating prevention sensor such as a thermostat at one side of an inner surface of a fan driving motor to precaution a damage of the fan driving motor and its related parts or a safety accident of a fire, etc. and, in particular, to substantially prevent the leakage of water outside, even if a main body is overturned due to a user's carelessness. According to the invention, the energy-saved smart safety cooling/warming wind apparatus for the four seasons is related to an energy saved safety technology.

BACKGROUND ART

In general, a cooling/warming wind apparatus has been used to air-conditioning an indoor in a manner that a cooling air is provided to an indoor for the air cooling in summer and a warming air to the indoor for the heating in winter.

FIG. 1 shows a longitudinal cross-section view of a conventional cooling/warming wind apparatus according to a prior art.

As shown in FIG. 1, a conventional cooling/warming wind apparatus 200 includes an air suction port 225 and an air filter 211 provided on the center of a rear surface of a main body 201, an air outlet 226 formed on a front upper portion of the main body 201 and a fan 203 and a fan driving motor 204 mounted on an inner center portion of the main body 201, the configuration of which has been well known now.

The cooling/warming wind apparatus 200 further includes a water tank 209 and a water pump 208 that is an underwater pump installed in an inner lower portion of the main body 201, a cold-storage material positioned in an inner portion of the water tank 209, a water curtain 210 and an air filter 211 provided in the air suction port 225 and an electric heater 205 installed in an air outlet 226.

As not explained in FIG. 1, a reference number 202 is a control box constituted as a control portion, a reference number 206 is a feed motor 235 and a reference number 235 is a low level sensor.

The conventional cooling/warming wind apparatus 200 draws up a water cooled through the cold-storage material 207 in the water tank 209 by means of the water pump 208 and flows it toward the water curtain 210 when used as a cooling wind apparatus in summer. At that time, as the cooled water is evaporated by an indoor air passing through the air suction port 225 and the air filter 211 in turn, the temperature dropped air is introduced into the air outlet 226 through the fan 203 and the air duct 212 to be supplied to the indoor.

The conventional cooling/warming wind apparatus 200 has a problem in that the air of the temperature lower than that of the indoor air is provided to the indoor, but it causes the unpleasantness of users resulted from the humidification effect due to the evaporation.

The conventional cooling/warming wind apparatus 200 has another problem in that in case of the continuous use of a system it causes the damage of the fan driving motor and its related parts or a fire due to the over-heating of the fan driving motor 201.

The conventional cooling/warming wind apparatus 200 has another problem in that it is inconvenient to replenish the water tank 209 with water because of changing an amount of water to be evaporated even in use for one day, and the water is spilt out of the inner portion of the water tank 209, thereby damaging a wooden floor.

On the other hand, when used in winter the conventional cooling/warming wind apparatus 200 has another problem in that the electric heater 205 and the fan 203 in a capacity of 2 to 3 KW are provided on the air outlet 226 to heat air introduced into the main body 201 through the air suction port 225 thereby making a warming wind and supply it through the air outlet 226 to the indoor, again. At that case the operation of the electric heater 205 incurs an excessive electric fee while sufficient humidification can't be expected, whereby it has problems in that it is uneconomic and causes phenomena making the skin of a man dried and chapped.

The conventional cooling/warming wind apparatus 200 has disadvantages upon the use in summer in that as it evaporates water to cool air, the cooling wind humidification occurs, not the cooling wind dehumidification required in summer. To it, the air at the air outlet 226 is very wetted in a significant degree, and the frequently replacement of the cold-storage material 207 and the usual replenishment of a water are required. For example, Korea Patent Nos. 10-0625751 and 10-0350775 disclosed the above mentioned features.

DISCLOSURE OF THE INVENTION

Technical Problem

An object of the invention designed considering the actual circumstances of a prior art is to provide an energy-saved smart safety cooling/warming wind apparatus for the four seasons to be air-conditioned for a better pleasant cooling/heating in a manner that a energy reduction relieves the burden of an electrical fee, a cooling wind dehumidification is possible in summer and a warming wind humidification is possible in winter.

The other object of the invention is to provide an energy-saved smart safety cooling/warming wind apparatus for the four seasons for performing a separate humidification in spring and summer and automatically making an electric heater operated within a predetermined temperature range in a rainy day or upon dropping in an indoor temperature in summer and winter.

Another object of the invention is to provide an energy-saved smart safety cooling/warming wind apparatus for the four seasons for enabling a pleasant air cooling and dehumidification as well as much more energy reduction with the adaption of a system different from a refrigerating cycle having disadvantages in that a dehumidifier regularly used in home in a high temperature and humidity summer can perform the dehumidification based on the refrigerating cycle by a refrigerant circulation in a degree of $\frac{1}{10}$, for example 200 to 300 W compared with a consumption electric power of an air conditioner, but it causes a noise generating and an indoor temperature rising due to the use of a compressor and a heat dissipating amount of a condensing unit upon the indoor operation of the dehumidifier with the condenser that is not installed outside, separately. Further, another object of the invention is to provide an energy-saved smart safety cooling/warming wind apparatus for the four seasons comprising an indoor temperature/humidity sensor installed on a system to compare indoor temperature and humidity sensed by the sensor with temperature and humidity previously set to a control box, which is linked to a system to artificially and intelligently operate, stop, intermit and continue to be operated in a systematic function, thereby saving the energy; a water temperature sensor in a water tank and a high-low water level gauge in the water tank operated in connection with a sheath heater to reduce the energy; and a high water level gauge for a dehumanization water tank installed in the water tank for the dehumidification to let a lamp on the control box in the front upper portion of a main body to be lit for a warning indication, thereby facilitating the removal of a water overflow or shortage.

Another object of the invention is to provide an energy-saved smart safety cooling/warming wind apparatus for the four seasons comprising an overheating prevention sensor such as a thermostat mounted at one side of an inner surface of a fan driving motor to precaution safety accidents such as a damage of the fan driving motor and its related parts or a safety accident of a fire, etc., due to an overheating if continuously used for a long time.

Another object of the invention is to provide an energy-saved smart safety cooling/warming wind apparatus for the four seasons comprising a waterspout cap, a particle separation membrane, a gasket or a gasket ring, etc., for the leakage prevention acting as a check valve in case that a main body is overturned due to an exterior impact or a user's carelessness, so that the water outflow from the inner of a water tank and a dehumidification water tank does not occur, thereby preventing the damage of a wooden floor.

Technical Solution

In order to resolve these and those problems as described above, an energy-saved smart safety cooling/warming wind apparatus for the four seasons according to the invention comprises: a main body; a control box mounted on a front upper portion of the main body; an indoor temperature/humidity sensor mounted on the front upper portion of the main body; a water tank including a low horizontal reservoir and a high vertical reservoir mounted in the main body; a sheath heater mounted in the low horizontal reservoir; a temperature sensor provided in the low horizontal reservoir; two pairs of cold-storage material members arranged away from each another in pairs on both sides in the inner of the high-vertical reservoir; first high and low water level gauges each provided in the low-horizontal reservoir and the high-vertical reservoir of the water tank, a water tank ventilator, a water tank outlet and a hemisphere stand mounted on four corners of the lower portion of the water tank, a matrix structure positioned in direct contact with a cold heat in the center of the high vertical reservoir or in indirect contact with a cold-heat obtained by the use of the cold storage material member in summer with being installed in an opening portion in the center of the high vertical reservoir; a fan and a fan driving motor arranged in the inner center of the main body to generate wind; an overheating prevention sensor such as a thermostat attached to one side of the inner surface of the fan driving motor; an air duct constructed extending from the inner center to upper portion of the main body to discharge air generated by the fan and fan driving motor outside; a feed motor and an electrical heater mounted to be moved up and down in the front of an air outlet of the air duct; a heat exchanger mounted in the air duct; a circulating pump arranged between the low-horizontal reservoir and the heat exchanger to supply water in the low horizontal reservoir to the heat exchanger; a humidification water tank including an ultrasonic humidification module in the inner upper portion of the high vertical reservoir; a supply hose extended from the low horizontal reservoir to the entrance of the heat exchanger and then from the exit of the heat exchanger to the inlet of a humidification water tank and including its fixing clamps; a matrix dehumidification water tank mounted in the inner center of the low horizontal reservoir and the high vertical reservoir and including a matrix dehumidification water tank outlet; a matrix dehumidification return hose including its fixing clamps and connected from the matrix dehumidification water tank outlet to a matrix water tank outlet formed at the lower center of the water tank; and an upward gradient tetrahedron portion making the upper surface of the dehumidification water tank raised toward the center on the outer upper surface of the low horizontal reservoir to flow water dew-condensed and dehumidified in summer into the water tank along the exterior surface of the water tank.

The dehumidification water tank includes a hemisphere stand engaged with the water tank hemisphere stand, a downward gradient tetrahedron portion constituted as the upper surface thereof including a dehumidification water tank inlet to be in connection with a dehumidified water from the matrix water tank outlet and to be projected downward toward the center of a dehumidification water tank cover, a waterspout cap fixed by a clamp to the dehumidification water tank inlet in the form of a lamp-oil container to act as a check valve along with an expanding surface at the lower thereof thereby preventing the leakage, a dehumidification water tank ventilator, a second high level water gauge for the dehumidification water tank and a dehumidification water tank outlet; particle separating membranes arranged on the water tank ventilator that is formed on the inner upper side of the high vertical reservoir, on a humidification outlet that is formed on the upper portion of the high vertical reservoir and on the dehumidification water tank ventilator that is formed on the rear upper side surface of the dehumidification water tank, etc. gaskets or gasket rings and/or rubbers or rubber rings mounted to prevent the leakage at the connecting portions for supplying water to and/or draining dehumidified water from the water tank, the humidification water tank, the matrix dehumidification water tank, the dehumidification water tank; front and rear surface covers of the main body attaching insulating materials for preventing a dew condensation on the inner surfaces of the main body, which are constituted as the case of the main body; other rubbers or rubber rings and/or gaskets or gasket rings mounted on an opening portion, a connecting portion, a coupling portion, etc. of the main body and its front and rear surfaces to prevent the leakage; and a handgrip and moving wheels.

Advantageous Effects

According to the invention, when used in summer, an energy-saved smart safety cooling/warming wind apparatus for the four seasons effectively performs the cooling wind dehumidification at first with the working of a wetness coil on a matrix structure made of a metal to be passed there through by a cold heat of cooling water heat-exchanged with a cold storage material member and the cooling wind dehumidification at second with the working of a dry coil on a heat exchanger upon passing air through the heat exchanger to which the cooling water is supplied. It forces the energy-saved smart safety cooling/warming wind apparatus for the four seasons not to consume water, almost, and not to need the replenishment of water with the water tank. The dehumidified water is collected into a dehumidification water tank and discharged outside through a dehumidification water tank outlet.

When used in winter, an energy-saved smart safety cooling/warming wind apparatus for the four seasons comprises a sheath heater having an electrical capacity of 1/10 less than that of a general electric heater and a water temperature sensor to be connected with each other so that the warming wind humidified air is obtained with sufficient vapor generated by a warming water and the operating of an ultrasonic humidification module and supplied to indoor so as to considerably reduce an energy upon supplying warming water to a humidification water tank on the upper portion of a high vertical reservoir through a heat exchanger by a circulation pump.

In this manner, the energy-saved smart safety cooling/warming wind apparatus for the four seasons not only contributes to the energy consumption reduction but also can add another functions of providing a proper temperature and the humidification of a proper humidity as a user requires, thereby preventing a skin dry of the user and making use of it conveniently in an economic use respect under a comfortable environment.

In addition, a separate humidification upon the drying of the indoor in spring or autumn, etc., and the operation of an electrical heater upon a sudden falling of an indoor temperature when used in summer and autumn can provide an instant warming wind not to drop down a temperature less than a predetermined one for a while. At that time, a control box mounted on a main body with a temperature and humidification previously set and a temperature sensor of indoor temperature/humidity sensors are operated by their linkage to one another to promote the energy reduction.

Accordingly, the installation of the indoor temperature/humidity sensor on the upper portion of the main body and a sheath heater and a water temperature sensor in a low horizontal reservoir enables the comparison of the indoor temperature and humidity with predetermined temperature and humidity previously set to automatically and systemically embody the intermittent operation and stop and continuous operation, thereby facilitating the operation of a system and reducing the energy as well.

An overheating prevention sensor such like a thermostat is mounted on an inner portion of a fan motor to prevent the damage of the fan driving motor and its other components and a safety accident of a fire, etc.

With it, selection switches in the control box, first high and low water level gauges in the water tank and second high and low water level gauges in the dehumidification water tank are very convenient for resolving the problems related to the water by issuing the warning indication upon lack of water or generating of excessive water and water draining.

Besides, even if the main body is overturned due to an exterior impact and a user's carelessness, a waterspout cap for preventing the leakage of dehumidified water, a particle separation membrane, gasket ring or gasket, rubber or rubber ring, etc. cuts off the leakage of water outward, thereby avoiding the damage of a wooden floor, really.

MODE FOR CARRYING OUT THE INVENTION

The present invention will now be described more fully with reference to the accompanying drawings, in which exemplary embodiments of the invention are shown. In this specification, "lower" or "low" refers to a portion that is below another portion, and "upper" or "high" refers to a portion that is above another portion when the apparatus is placed in its intended positioning for use.

Figure 1:
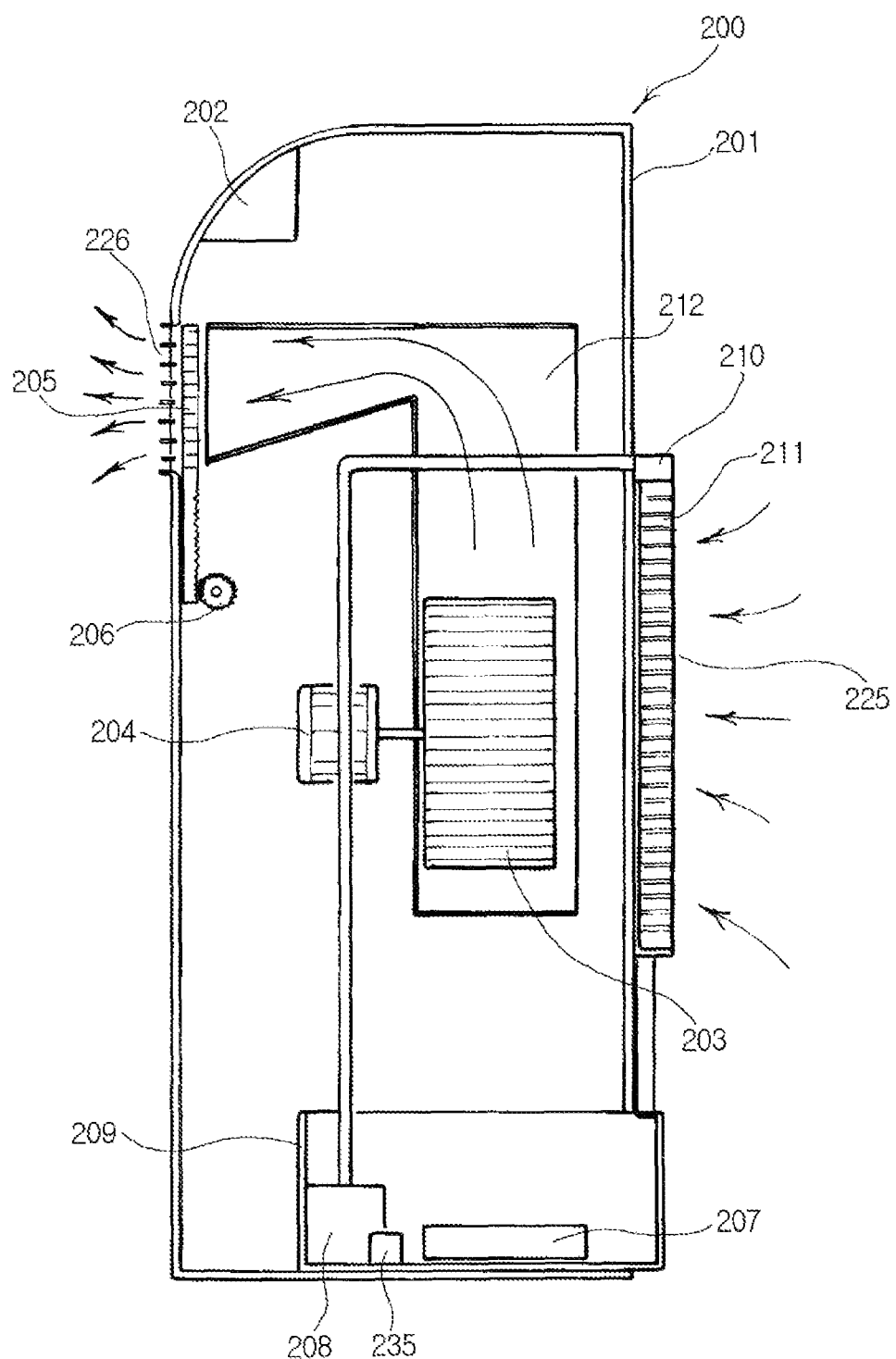
FIG. 1 is a longitudinal cross-sectional view showing a conventional cooling/warming wind apparatus or air conditioner according to a prior art.
Figure 2:
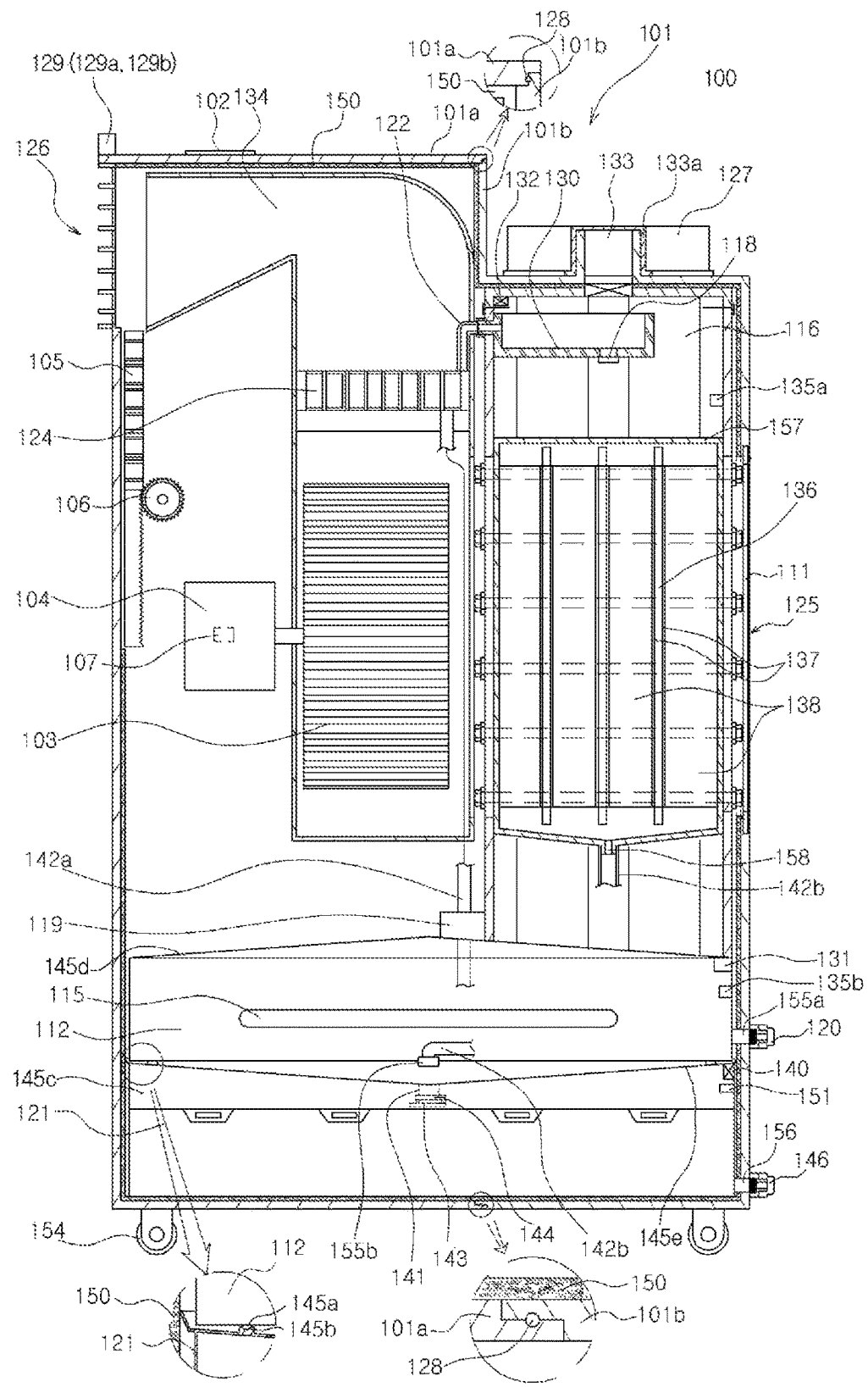
FIG. 2 is a longitudinal cross-sectional view illustrating important parts of an energy-saved smart safety cooling/warming wind apparatus according to one embodiment of the invention.
Figure 3:
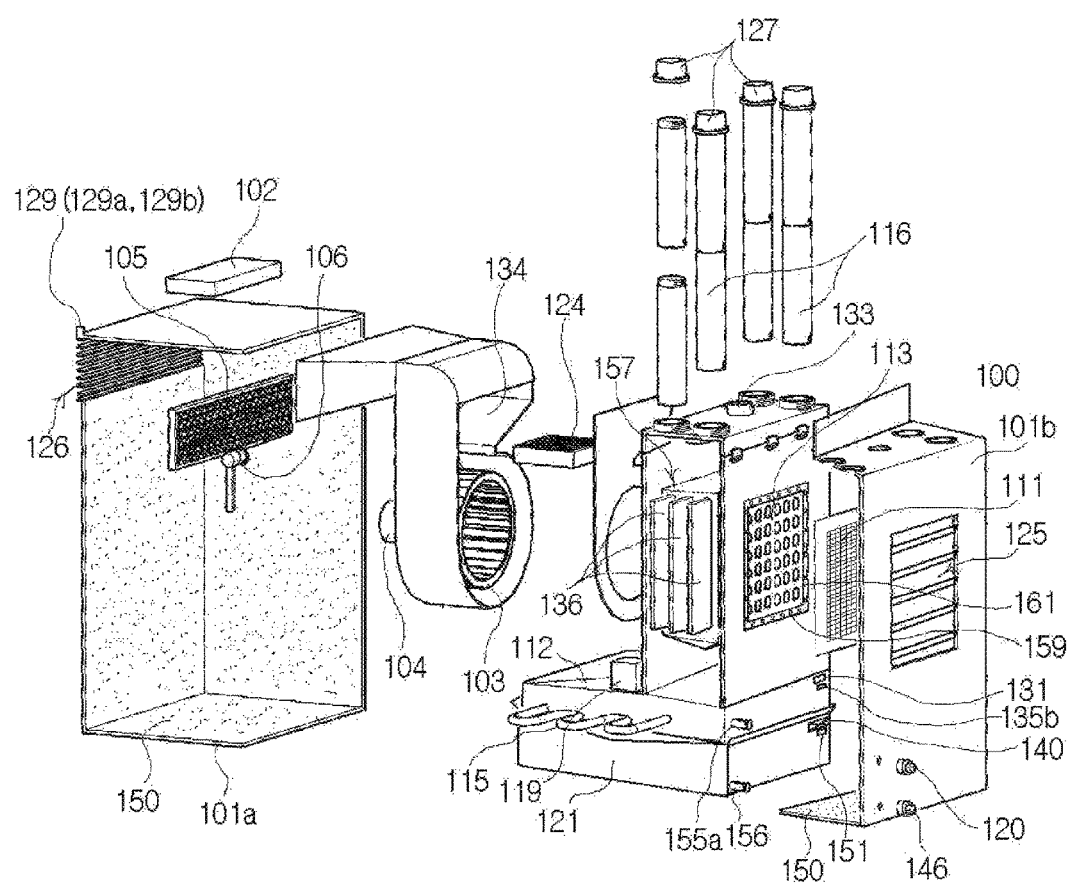
FIG. 3 is an exploded perspective view illustrating the energy-saved smart safety cooling/warming wind apparatus according to one embodiment of the invention.
Figure 4:
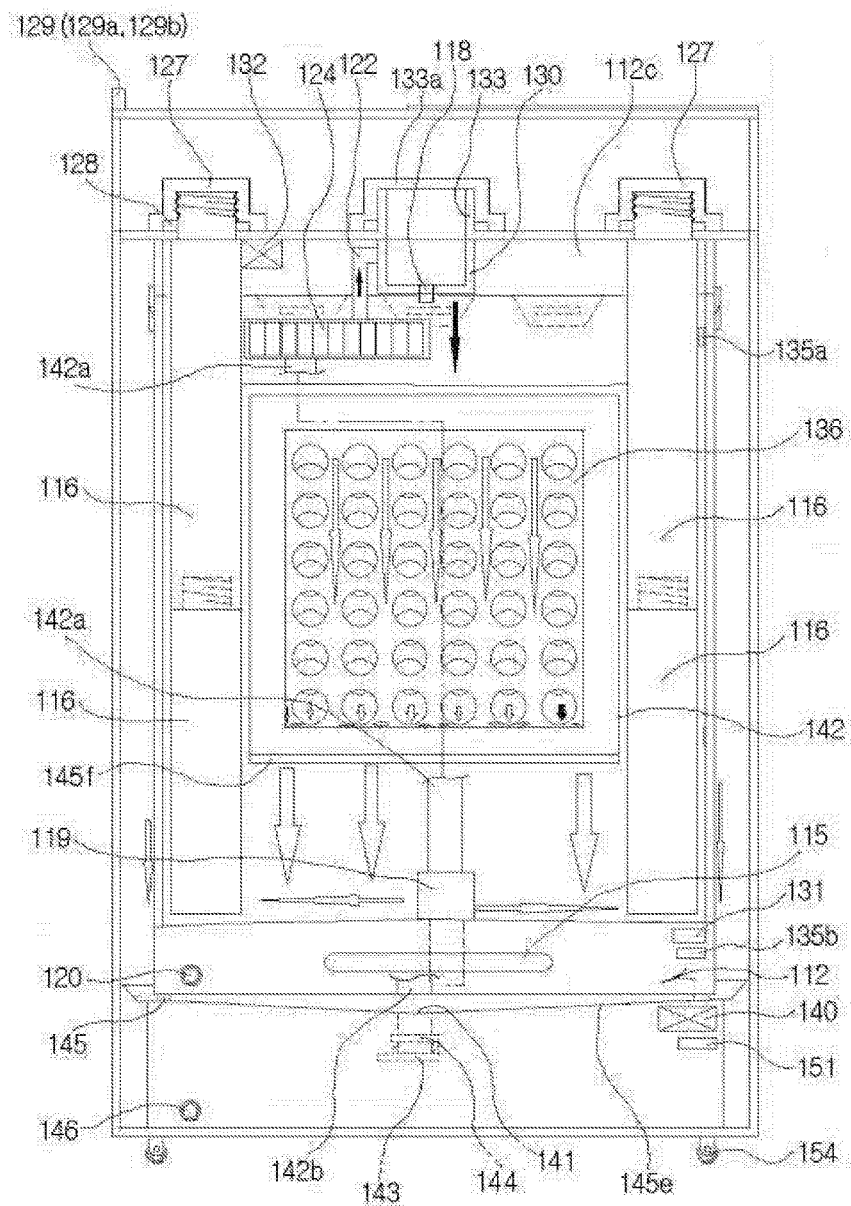
FIG. 4 is a rear longitudinal cross-sectional view illustrating important parts of the energy-saved smart safety cooling/warming wind apparatus according to one embodiment of the invention.

FIG. 2 shows a longitudinal cross-sectional view of important parts according to one embodiment of the invention, FIG. 3 shows an exploded perspective view one embodiment of the invention, FIG. 4 shows a rear view of important portions according to one embodiment of the invention.

Figure 5:
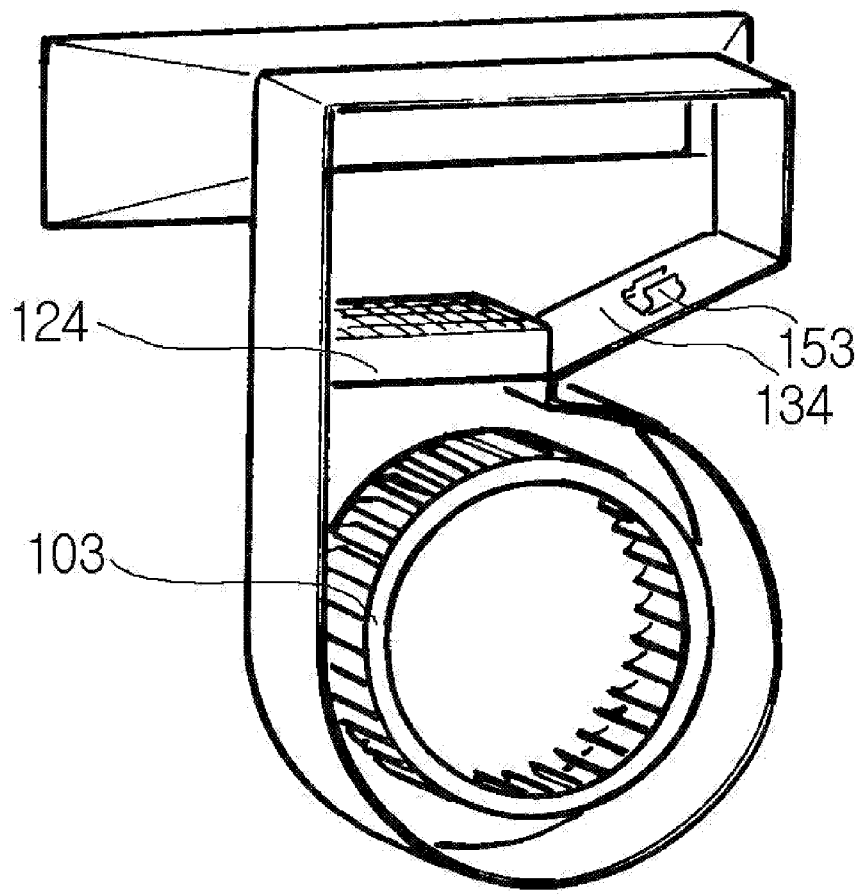
FIG. 5 is a perspective view illustrating a fan and an air duct of the energy-saved smart safety cooling/warming wind apparatus according to one embodiment of the invention.
Figure 6:
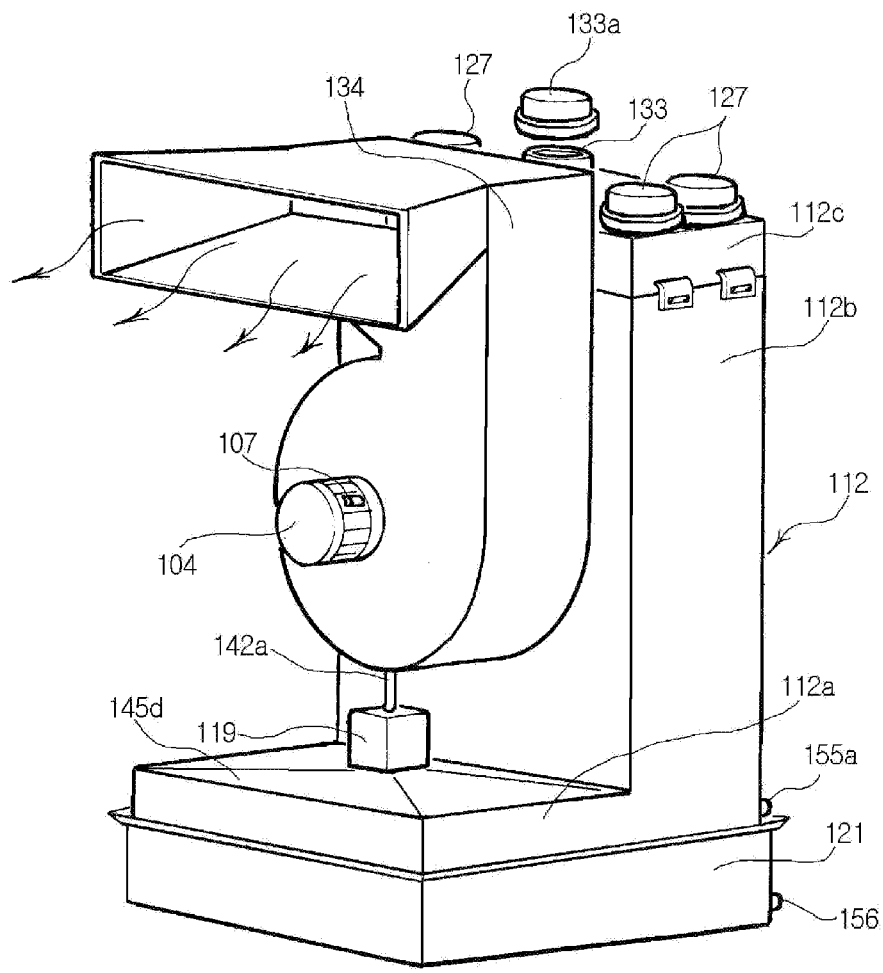
FIG. 6 is a front perspective view illustrating a water tank and the air duct of the energy-saved smart safety cooling/warming wind apparatus according to one embodiment of the invention.
Figure 7:
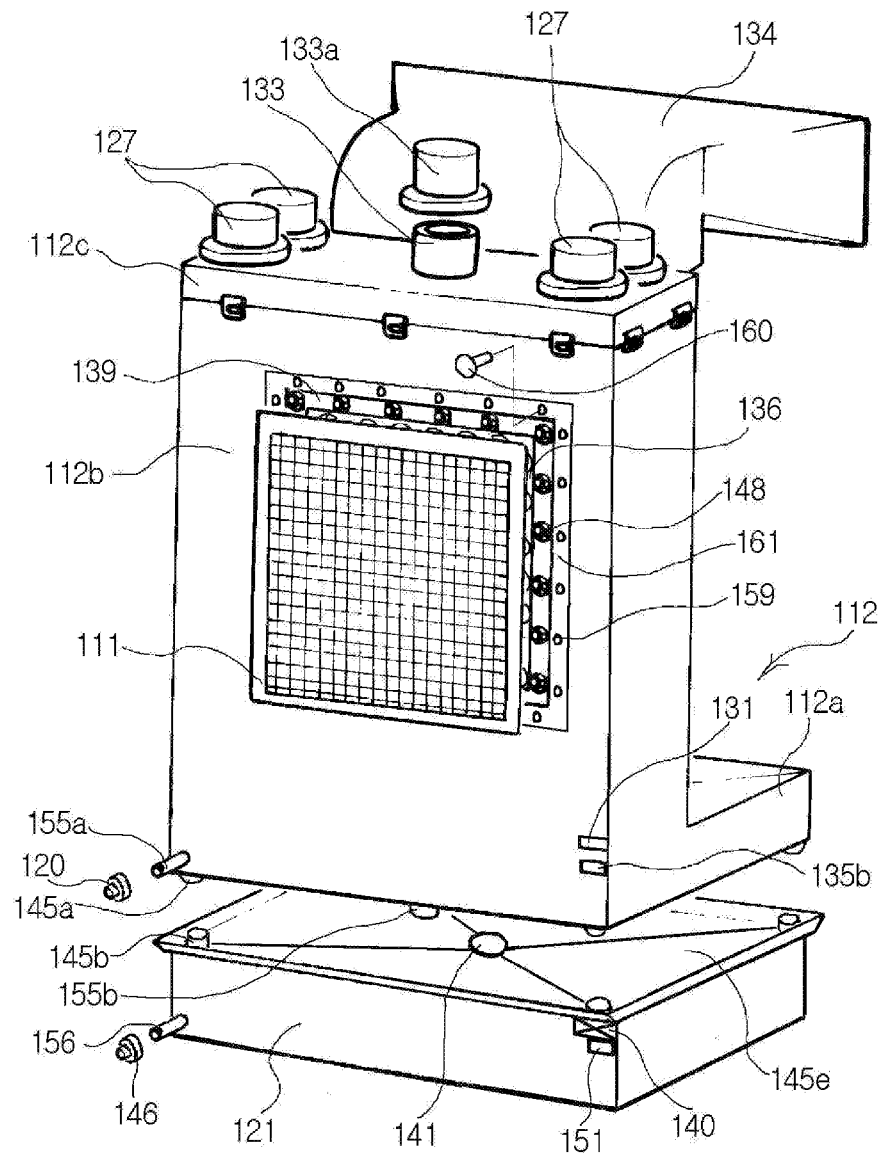
FIG. 7 is a rearward perspective view illustrating the water tank of the energy-saved smart safety cooling/warming wind apparatus; according to one embodiment of the invention

Further, FIG. 5 shows a perspective view of a fan and an air duct, FIG. 6 shows a front perspective view of portions adjacent to a water tank and the air duct according to one embodiment of the invention and FIG. 7 shows a rear perspective view of the water tank according to one embodiment of the invention.

As shown in FIG. 2 to FIG. 7, an energy-saved smart safety cooling/warming wind apparatus for the four seasons 100 comprises:

a main body 101;

a front cover 101a and a rear cover 101b coupled to each other to form a casing of the main body 100;

an indoor temperature-humidity sensor 129 and a control box 102 mounted on a front upper portion of the main body 101;

a water tank 112 mounted in the main body 101 and including a low horizontal reservoir 112a and a high vertical reservoir 112b;

a water temperature sensor 131, a first low lever water gauge 135b and a sheath heater 115 provided in the low horizontal reservoir 112a;

two pairs of cold-storage material members 116 spaced away from one another on both sides in the inner portion of the high-vertical reservoir 112b;

a first high water level gauge 135a mounted in the upper side of the water tank vertical portion 112b;

a matrix structure 113 mounted in an opening 142 on the center portion of the high vertical reservoir 112b and including a downward gradient shape portion 145f sloped from both sides of the opening 142 toward the center of the opening portion 142 for discharging water dehumidified with a cold-heat by the use of the cold storage material member 116 in summer and a first heat-exchanging with air to be moved by the operating of a fan 103, in which the opening 142 includes a protrusion piece 161 made of a material the same as that of the water tank 112, on the rectangular circumstance of which fixing holes 159 are perforated, attached by fixtures 160 fitted into the fixing holes 159 thereto, in which the matrix structure 113 is in the indirect contact with the cold-heat generated by using the cold storage material member 116 or in direct contact with the cold-heat in summer with being mounted to the center portion of the inner and outer surfaces of the high vertical reservoir 112b in a matrix dehumidification water tank 157;

a fan 103 and a fan driving motor 104 arranged in the inner center of the main body 101 to generate wind;

an overheating prevention sensor 107 attached to the inner surface of the fan driving motor 104;

an air duct 134 mounted in the upper portion of the main body 101 to discharge air generated by the fan 103 and the fan driving motor 104 outside from the main body 101;

a feed motor 106 and an electrical heater 105 mounted to be moved up and down in the front of an air outlet 126 of the air duct 134;

a heat exchanger 124 mounted in the inner portion of the air duct 134; and a circulating pump 119 arranged between the low-horizontal reservoir 112a and the heat exchanger 124 to supply water in the water tank 112 to the heat exchanger 124, in which the water tank 112 includes a water tank ventilator 132, a first high water level gauge 135a, a first low water level gauge 135b, a sheath heater 115, a water temperature sensor 131 and a water tank outlet 155a mounted therein and/or thereon.

Specially, the attachment of the first high water level gauge 135a and the first low water level gauge 135b to the water tank 112 enables the lighting of a lamp on an indicating window of a control box 102 that is mounted on the upper portion of the main body 101 to detect the water level and discharging water in the water tank 112 outside through the water tank outlet 155a with a drain cap 120 on a rear cover 101b opened.

Figure 8:
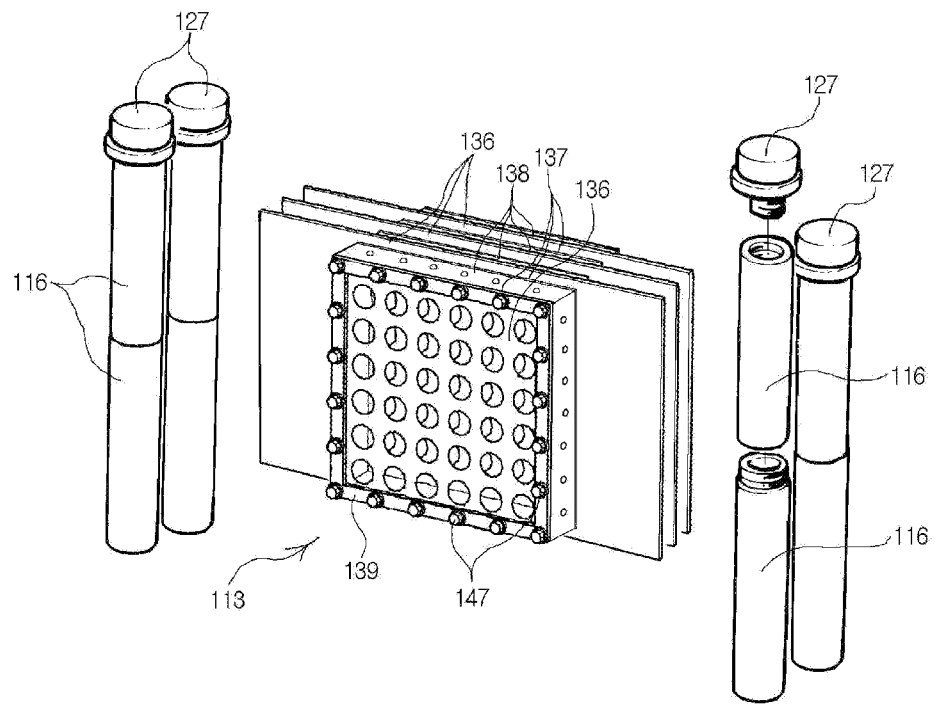
FIG. 8 is a perspective view illustrating a coupling portion of a matrix structure heat-transferred in direct contact with a cool heat in summer and a cold storage member which are mounted in a water tank of the energy-saved smart safety cooling/warming wind apparatus according to one embodiment of the invention.
Figure 9:
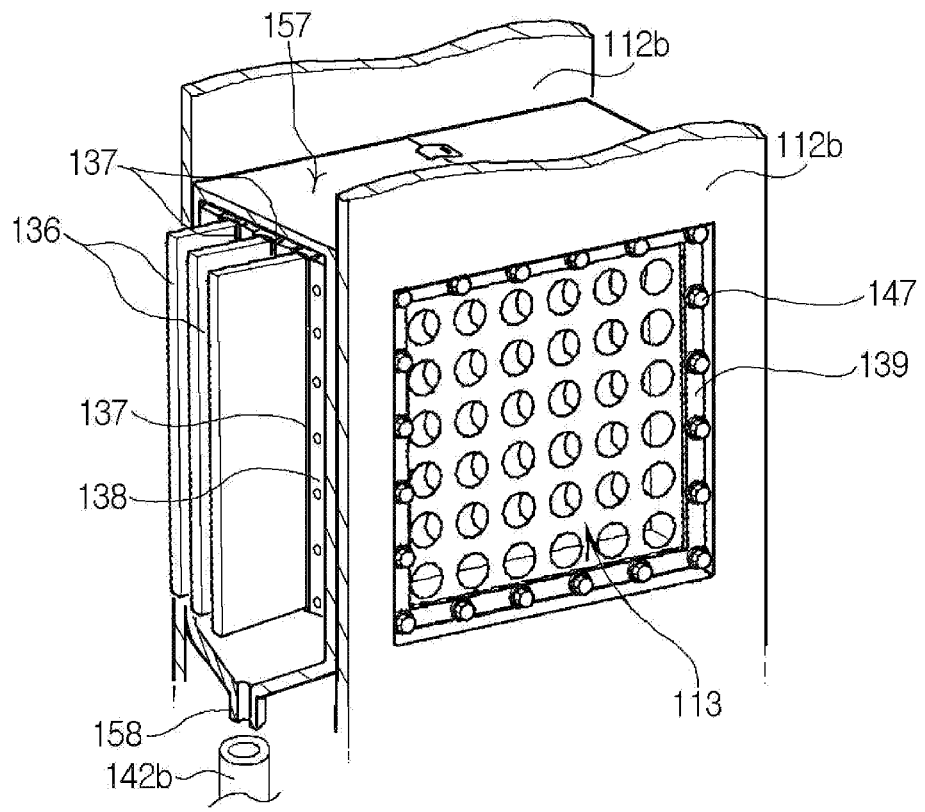
FIG. 9 is a perspective view illustrating a coupling portion of the matrix structure heat-transferred in direct contact with the cool heat in summer and a matrix dehumidification water tank which are mounted in the water tank of the energy-saved smart safety cooling/warming wind apparatus according to one embodiment of the invention.
Figure 10:
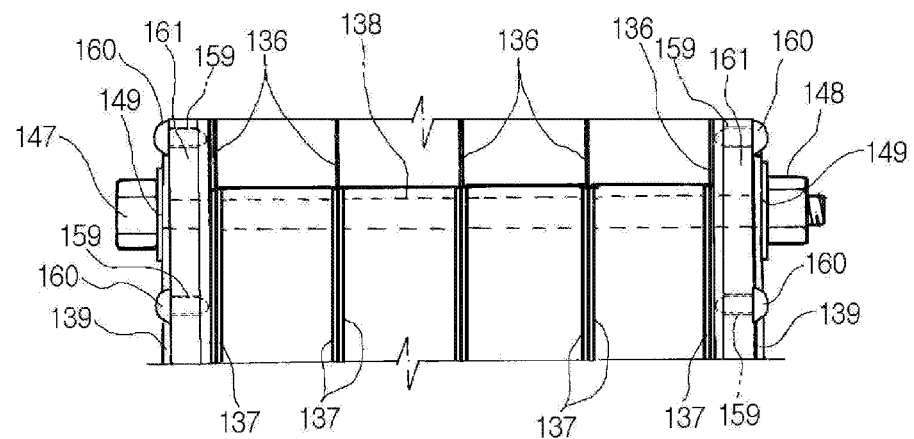
FIG. 10 is an enlarged planar view illustrating perforated plates constituted as the matrix structure heat-transferred in indirect contact with the cool heat in summer and mounted in the opening of the matrix water tank according to one embodiment of the invention.

FIG. 8 is a perspective view showing a coupling portion of a matrix structure and a cold material member heat-transferred in direct contact with a cold-heat therebetween, which are mounted in a water tank, FIG. 9 is a perspective view showing a coupling portion between the matrix structure and a dehumidification water tank heat-transferred in direct contact with the cold-heat in summer, which are mounted in the water tank and FIG. 10 is an enlarged view showing the coupling of perforated plates constituted as the matrix structure heat-transferred in indirect contact with the cold-heat, which is mounted on an opening of the matrix structure.

FIG. 10 shows an enlarged planar view illustrating perforated plates constituted as the matrix structure heat-transferred in indirect contact with the cool heat in summer and mounted in the opening 142 of the matrix water tank according to one embodiment of the invention As shown in FIGS. 8 and 9, in order to effectively heat-transfer and dehumidify in direct contact with the cold-heat using the cold storage material member 116, a matrix structure 113 is mounted in a high vertical reservoir 112b as shown in the cross-sectional view of FIG. 2 and includes a predetermined number of perforated plates 136 having a relatively longer transverse portion extended from both sides of the high vertical reservoir 112b and mounted in the dehumidification water tank 157 provided with gaskets 137 that are arranged therein to be spaced away from each another.

A rectangular space bar 138 is mounted to maintain a gap between the perforated plates 136, on which a number of relatively smaller holes are perforated to pass through water dehumidified with the cold-heat by the use of the cold storage material member 116 in summer. As the perforated plates 136 are assembled as shown in FIGS. 8 and 9 and described in detail below, the dehumidified water is stored in the lower portion of the dehumidification water tank 157 and then discharged from a matrix dehumidification water tank outlet 158 through a matrix water tank outlet 155b affixing a return hose 142b by a clamp 144 thereto and then the dehumidification water tank inlet 141 into the water tank 121.

As shown in FIG. 10, a matrix structure 113 is mounted in an opening 142 formed at the center portion between the front and rear surfaces of a high vertical reservoir 112b and includes a plurality of perforated plates 136 constituted as multiple metal plates between a pair of coupling plates 139 and space rectangular bars 138 arranging the perforated plates 136 to be spaced away in a distance from each another, in which the perforated plate 136 includes a plurality of holes perforated in a zigzag form to pass air generated by a fan 103 there through, and the space rectangular bar 138 includes a number of relatively smaller holes to allow dehumidified water to be passed there through. The space rectangular bars 138 are fixed to the front and rear surfaces of the high vertical reservoir 112b using bolts 147 passing there through, the gaskets 137, washers 149, nuts 148, etc., in a known manner, the detailed explanation of which is omitted.

The matrix structure 113 allowing air to be in indirect contact with the cold heat by the use of the cold storage material member 116 in summer includes the perforated plates 136, in which a rectangular circumference of the perforated plated positioned on the front and rear sides thereof a little enlarged, and is mounted on the opening portion 142 of the front and rear surface of the water tank 112b, to which the circumference enlarged portions are attached with protrusion pieces 161 fixtures 160 fitted into fixing holes 159 perforated thereon.

A control box 102 positioned on the upper surface of the main body 101 is provided with a selection switch, temperature and humidification devices, etc. and their related components and an indication window, and four moving wheels 154 are mounted on four corners of lower surface of the main body 101 as shown in FIG. 2.

Figure 11:
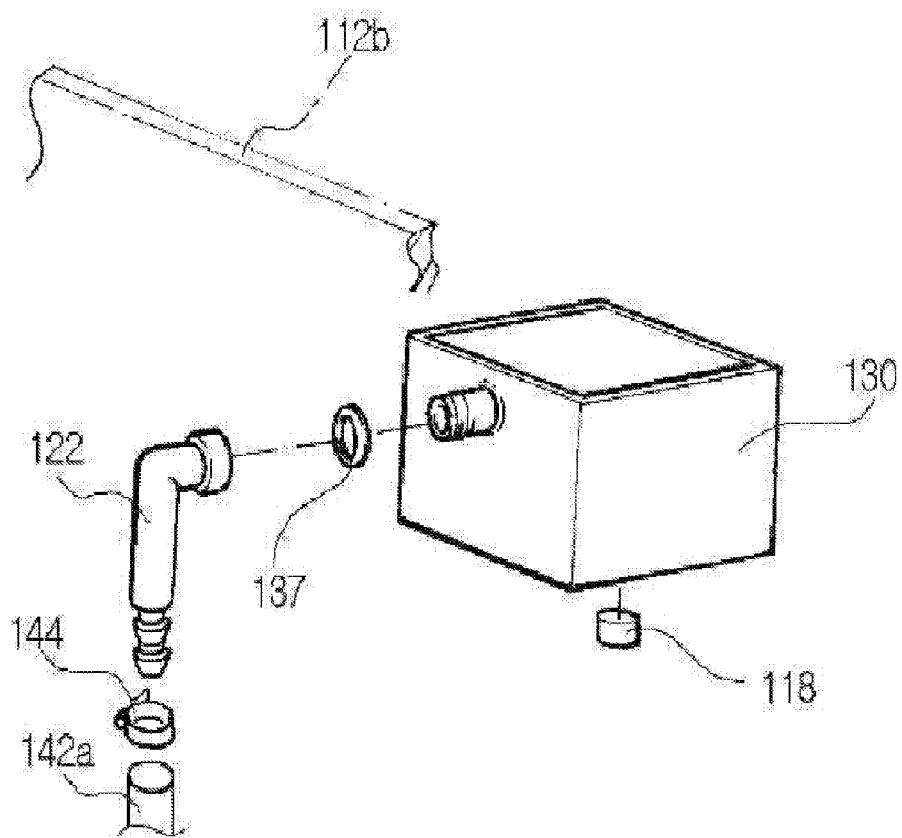
FIG. 11 is a perspective view illustrating a humidification water tank attached to the inner upper portion of the water tank according to one embodiment of the invention.
Figure 12:
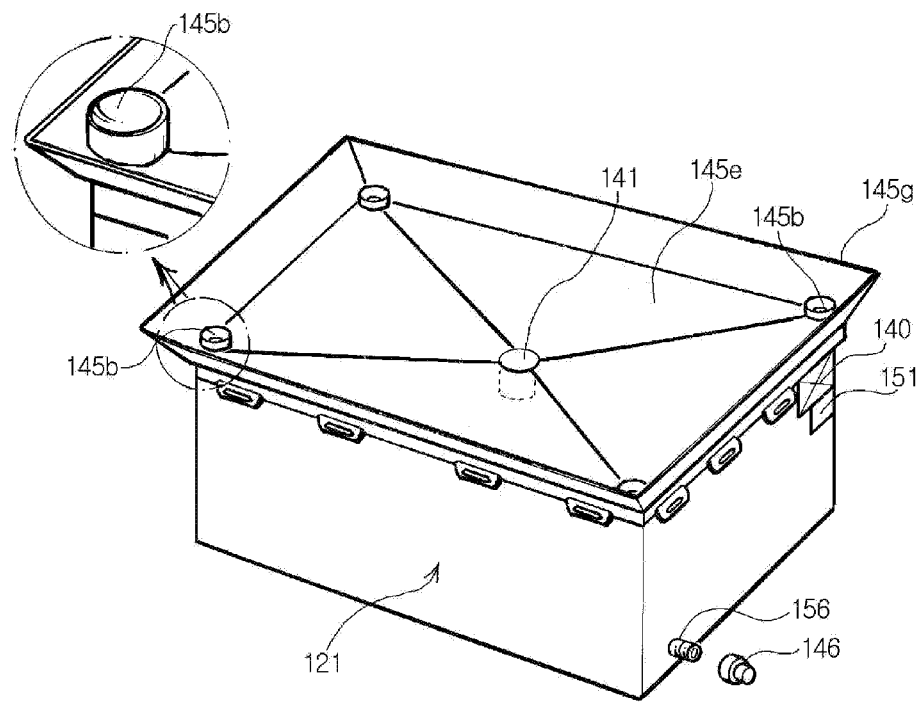
FIG. 12 is a perspective view illustrating a dehumidification water tank according to one embodiment of the invention.

FIG. 11 is a perspective view showing a humidification tank mounted in the upper portion of a high vertical reservoir 112b, and FIG. 12 is a perspective view showing a dehumidification water tank.

As shown in FIGS. 2 to 12, a humidification water tank 130 provided with a humidification module 118 is mounted on the upper portion of a high vertical reservoir 112b, and an indoor temperature/humidification sensor 129 is mounted on the front upper portion of the main body 101.

A sheath heater 115 and a water temperature sensor 131 are mounted in a low horizontal reservoir 112b to maintain a sterilization temperature of 85° C. associated with a water temperature for sterilizing various bacteria, virus, etc. thereby saving the energy.

In order to remove water generated under the phenomena of the dehumidification and dewing on the outer surfaces of the low horizontal reservoir 112a and the high vertical reservoir 112b upon using in summer, the low horizontal reservoir 112a includes an upper surface in the form of upward gradient rectangular shape portion 145d, and a water tank hemisphere stand 145a is mounted on the lower rectangular corners of the water tank 112 to provide a gap for facilitating dehumidified water to be introduced there into.

The dehumidification water tank 121 has a cross section a little greater than the lower portion of the dehumidification water tank 112, which is in form of a dish deepened at 45° downward from the circumference of the dehumidification water tank 121.

The upper surface of the dehumidification water tank 121 includes a downward gradient rectangular shape portion 145e moved to the center thereof, so that the dehumidified water from the dehumidification water tank outlet 155b and dewing or dehumidified water from the outer surface of the dehumidification water tank 112 is totally collected at a dehumidification water tank inlet 141 projected at the center of the dehumidification water tank 121. Further, in order to prevent the leakage of the dehumidified water from the dehumidification water tank 121 upon the falling down of the main body 101, a waterspout cap 143 is mounted on the water tank inlet 141 by means of a clamp 144, etc.

On the rear upper wall of the dehumidification water tank 121 a dehumidification water tank ventilator 140, a high water level gauge 151 and a drain cap 146 linked with a dehumidification water tank outlet 156 are mounted. A high water level gauge 151 is provided on the dehumidification water tank 121 to light a lamp in an indication window of the control box 102 and drain dehumidified water through the dehumidification water tank outlet 156 projected from the lower opening of a rear cover 101b at the same time of the removal of the drain cap 146.

Further, waterspout cap 143 for preventing leakage is mounted on the dehumidification water tank inlet 141, the particle separation membrane 117 is mounded on the water tank ventilator, the humidification outlet, and the dehumidification water tank ventilator.

In order to allow the supply and collection of water to the low horizontal reservoir 112a, the high vertical reservoir 112b, the humidification water tank 130 and the dehumidification water tank 121, the coupling of a water supply hose 142a and a water return hose 142b with a gasket ring or gasket 137 and rubber or a rubber ring 128 are provided with the clamp 144 for fixing them to one another to prevent the leakage of water upon their coupling as described in detail below.

In particular, an energy-saved smart safety cooling/warming wind apparatus 100 for the four seasons according to the invention includes a casing of a front cover 101a and a rear cover 101b coupled to each other and insulating materials 150 built in the casing for preventing the dewing.

The main body 101 is constructed to prevent the leakage of water in a manner that the rubber or rubber ring 128 is provided on an opening portion, a connection portion, a coupling portion, etc. of the front cover 101a and the rear cover 101b upon combining front and rear portions thereof to each other.

According to the invention, an energy-saved smart safety cooling/warming wind apparatus 100 for the four seasons performs the dehumidification operation, continuously, while the matrix structure 113 and the heat exchanger 124 are operated when used in summer.

In other words, air suctioned from the air inlet 125 provided on the rear surface of the high vertical reservoir 112b passes through the matrix structure 113 cooled by the cold storage material members 116 via an air filter 111. At that time, the air flow is made in a zigzag form on the perforated plates 136 having a plurality of holes perforated there through and heat-exchanged with the matrix structure 136 for an increased staying time to be first cooled and converted into a cooling wind, and then the humidification occurs in a manner that the wetness is adsorbed to the perforated plates 136 of the matrix structure 113 like a kind of a wet coil.

Thereafter, the air in the process of being supplied to an air outlet 126 by the fan 103 is secondly cooled passing through the heat exchanger 124 in the form of a dry coil mounted in the air duct 134, into which the cooled water is supplied, and dehumidified on the surface of the heat-exchanger 124 to effectively supply the cooled and dehumidified air to the air outlet 126.

At that time, because the supply hose 142a is connected to the humidification water tank inlet 122 by the clamp 1144 and fixed to a fixing groove 153 on the inner surface of the air duct 134, the cooling water in the water tank 112 is supplied to the heat exchanger 124 by means of the circulation pump 119. Thereafter, the cooling water passing through the heat-exchanger 124 is returned via the humidification water tank 130 and the humidification module 118 during being not operated based on the selection switch of a system control portion into the high vertical reservoir 112b and then the water tank 112, thereby establishing one cycle of a dehumidification process.

As described above, the energy-saved smart safety cooling/warming wind apparatus 100 for the four seasons consumes water, not a conventional evaporation manner of the dehumidification, and allows the air passing the matrix structure 113 to be cooled by the cold-heat of the cold storage material member 116 to be first cooled and dehumidified in earnest and then cooled and dehumidified again with the cooling water supplied by the circulation pump 119 in the procedure of passing through the heat exchanger 124. Such like twice cooled and dehumidified air is supplied to the indoor. the energy-saved smart safety cooling/warming wind apparatus 100 for the four seasons can be conveniently and economically used in a better comfortable environment in summer than a conventional cool wind apparatus and air conditioner.

Even upon using the cool wind in summer, the energy-saved smart safety cooling/warming wind apparatus 100 has the insulating material 150 attached on the inner surfaces of the covers to prevent the occurrence of the dewing.

In particular, upon a sudden drop in an indoor temperature in a rainy day or season, based on the selection switch of the control box 102 the water in the water tank 112 is not heated and supplied by the non-operation of the circulation pump 119, and the moving motor 109 is driven to move the electric heater 105 to the air outlet 126 and then operate the electric heater 126 to supply an instant warming air only in a temporary control, when a temperature sensed by the indoor temperature sensor 129a of the temperature humidification sensor 129 is below a predetermined temperature.

On the other hand, the conventional cooling/warming wind apparatus rises the indoor temperature with an electric heater having the consumption power of 2~3 KW to rise an air temperature, thereby causing an excessive power consumption, but the energy-saved smart safety cooling/warming wind apparatus 100 for the four seasons allows the sheath heater 115 of 0.2~0.3 KW that is a degree of one to ten compared with the heater mounted in the water tank 112 to heat the water in the water tank 112 by 85° C. capable of sterilizing bacteria and the circulate the warming water by the circulation water for the warming dehumidification.

In order to generate the warming wind in winter, the energy-saved smart safety cooling/warming wind apparatus 100 forces the indoor air introduced through the air inlet 125 on the rear surface of the high vertical reservoir 112b to pass through the air filter 111 and the perforated plates 136 of the matrix structure 113 and first rise its temperature by the heated water based on the water temperature sensor 131.

At the same time, the energy-saved smart safety cooling/warming wind apparatus 100 forces the air passing through the air duct 134 by the operation of the fan 103 to be secondly raised at the temperature with being heat-exchanged with the warming water supplied via the water supply hose 142a by the circulation pump 119 and then supplies the warming air to the indoor through the air outlet 126 in front upper portion of the air duct 134.

Simultaneously, for the humidification in winter, the energy-saved smart safety cooling/warming wind apparatus 100 generates the vapor in a manner that the sheath heater 115 in the water tank 112 heats water and provides the warming air into the indoor through the water tank ventilator 132 on the upper portion of the water tank 112 and the air outlet 126 on the front surface of the main body 101.

Herein, the warming water passes through the heat exchanger 124 via the supply hose 142a by the circulation pump 119 to be supplied into the humidification water tank 130 mounted in the high vertical reservoir 112b using the supply hose 142a fixed by the cramp 144, the elbow 152, the gasket 137, etc. And then, the humidification module 118 is operated to supply sufficient vapor to the indoor.

The control box 102 enables the control of a humidification amount to be humidified based on the connection relationship of a predetermined humidity previously set therein with an indoor humidity sensor 129b of the temperature/humidity sensor 129.

Thereafter, if a humidity amount of vapor is proper, the system control portion stops the operation of the humidification module 118 to prevent the further energy consumption.

In spring or autumn, the sheath heater 115 in the water tank 112 is operated based on the selection switch of the control box 102 to perform the humidification with the rising of the water temperature. The ultrasonic humidification module 118 performs another humidification operation, when the warming water in the water tank 112 is supplied through the supply hose 142a and the heat exchanger 124 into the humidification water tank 130.

In summer and autumn, when a temperature detected by the indoor temperature sensor 129a of the temperature humidity sensor 129 is below a predetermined temperature previously set upon the sudden dropping of the indoor temperature or raining, the system control portion operates only the electrical heater 105 to supply the instant warming.

On the other hand, in order to prevent the water leakage from the main body 101 upon the overturning of the main body 101 to exterior impacts or user's carelessness, the energy-saved smart safety cooling/warming wind apparatus 100 includes the waterspout cap 143 serving as a check valve along with an enlarged surface of the lower portion thereof, in which the waterspout cap 143 is coupled by the clamp 144 to the lower portion of the dehumidification water tank inlet 141 projected downward toward the center of the dehumidification water tank cover 145c, particle separating membranes 117 on the water tank ventilator 132, the humidification outlet 133, the dehumidification water tank ventilator 140, etc.; and gasket ring or gasket 137 and rubber or rubber ring 128 for the prevention of the water leakage from the water tank 112, humidification water tank 130, the matrix dehumidification water tank 157 and the dehumidification water tank 121 upon supplying, collecting and dehumidifying water.

That is to say, the supply hose 142a and the dehumidification return hose 142b are coupled by the clamps 144 to the water tank 112, humidification water tank 130, the matrix dehumidification water tank 157 and the dehumidification water tank 121 to prevent the water leakage. The gasket ring or gasket 137 and the rubber or rubber ring 128 are mounted on the opening portion, the connection portion and the coupling portion of the front cover 101a and the rear cover 101b in order to cut off the leakage of water out of the water tank 112 to an indoor floor, thereby resolving the problem of the conventional cooling/warming wind apparatus in that the wooden floor is damaged due to the spilt water.

The energy-saved smart safety cooling/warming wind apparatus 100 for the four seasons is described in detailed in connection with the use thereof.

When used in summer, the water circulation is made in a manner that the water in the water tank 112 is cooled/converted into a cooling water passing by the cold storage material member 116 and then supplied through the supply hose 142a to the heat exchanger 124 by means of the circulation pump 119 to cool air introduced into the main body 101. Then, a water discharged out of the heat exchanger 124 is returned through the humidification water tank inlet 122, the humidification water tank 130 and the humidification module 118 that are not operated in summer for the re-circulation into the water tank 112.

And, in the process of supplying the cooling wind, air is flowed by the fan 103 to pass through the matrix structure 113 via the air inlet 125 and the air filter and forces it to be clashed against the perforated plates 136. At that time, the matrix structure 113 is heat-transferred in indirect contact with the cold heat by the cooling water that is cooled with the cold storage material member 116, and the wetness contained in the air is adsorbed onto the surface of the matrix structure 113 to actually start the dehumidification operation and then introduce a natural drain of the dehumidified water into the downward gradient shape portion 145f sloped toward the center from both lower sides of the opening 142. The dehumidified water is drained out of the water tank 112 via the high vertical reservoir 112b and the low horizontal reservoir 112a to generate the cooled/dehumidified air, firstly.

Explaining it again in detail, the matrix structure 113 enables air passing there through to be stayed for a relatively longer time therein with a number of holes perforated on the perforated plates 136 being arranged in a zigzag form, thereby increasing the heat exchanging effect. In order to naturally drain the dehumidified water upon the first heat exchanging of a flowing air with the cold heat by the use of the cold storage material member 116 in summer, the downward gradient tetrahedron portion 145f is formed on the lower surface of the high vertical reservoir 112b toward the center from both lower sides of the opening portion 142.

For the cold heat and dehumidification by the heat transferring of the cooling water in more effective and positive manners in summer, the matrix structure 113 may be mounted in the high vertical reservoir 112b to be in direct contact with the cold heat. For example, a water dehumidified by air introduced into the matrix structure 113 is carried into the dehumidification water tank 121 without mixing the dehumidified water with water stored the water tank 112. For it, the matrix structure 113 includes the rectangular space bar 138 having a number of small holes perforated thereon to facilitate the dehumidified water to be moved and the dehumidification water tank 157 provided with the dehumidification water tank outlet 158 to move to/store in it the water tank 121 as shown FIGS. 8 and 9.

In particular, two matrix dehumidification water tanks 157 are combined with each other to be positioned on the left and right thereof by the reference of the moving direction of air introduced into the matrix structure 113. The perforated plates 136 projected from the opening portions of both dehumidification water tanks 157 are fitted into the gaskets 137 provided in the dehumidification water tanks 157. Thereafter the dehumidification water tank 157 is coupled with the matrix structures 113 in a manner to contain the matrix structure 113 using the rubber ring 128 and the gasket 137, etc., adapted to their inner grooves upon their coupling, thereby inhibiting the leakage of the dehumidified water.

In addition, the return hose 142b is fixed to the lower of the matrix dehumidification water tank outlet 158 by the clamp 144 and connected to the matrix water tank outlet 155b of the low horizontal reservoir 112a. Therefore, the dehumidified water in the matrix structure 113 is flowed into the dehumidification water tank inlet 141 projected downward from the center of the dehumidification water tank cover 145c. Herein, it is known that for the provision against the falling down of the main body 101 the waterspout cap 143 including an enlarged surface on the lower portion thereof is mounted to the dehumidification water tank inlet 141 with the clamp 144.

In other words, as the introduced air is clashed against the matrix structure 113, the wetness contained in air is adsorbed to the outer surface of the matrix structure 113 in the form of a kind of a wetness coil, and air temperature is first dropped down due to the removal of the heat. The air is secondly heat-exchanged by passing through the heat exchanger 124 prior to being supplied into the air outlet 126 by the fan 103, thereby cooling and dehumidifying the air, additionally.

The whole amount of the dehumidified water is collected because water tank hemisphere stands 145a are provided at the rectangular corners on the lower portion of the water tank 112 to provide a gap, the upper cross-section of the dehumidification water tank 121 is constructed to be somewhat greater than the lower cross-section of the water tank 112, and the surface of the rectangular circumference on the upper portion of the dehumidification water tank 121 is extended at an angle of 45 degree there from with the same material in a dish form.

In particular, in order to position the water tank 112 on the rectangular corners of the upper surface of the dehumidification water tank 121, the water tank 121 includes a dehumidification water tank hemisphere stand 145b engaged with a water tank hemisphere stand 145a and a downward gradient tetrahedron portion 145e formed at the center on the upper portion thereof to flow the dehumidified water into the center, pass it through a dehumidification water tank inlet 141, the waterspout cap 143, etc. and then store it in the dehumidification water tank 121.

According to the invention, an energy-saved smart safety cooling/warming wind apparatus 100 for the four seasons establishes the first heat exchange through the matrix structure 113 mounted at the center of the high vertical reservoir 112b and the second heat exchanger through the heat exchanger 124 mounted in the air duct 134.

If the warming wind is required for a time upon the sudden rainy in summer or dependent upon the temperature tendency of a person, the electrical heater 105 of a small electrical capacity on the low level of 0.2 to 0.3 KW is artificial-intelligently operated for a while to use the instant warming wind by the summer switch selection of the control box 102 without heating water in the water tank 112.

In order to circulate the water upon the use of winter, the sheath heater 115 on the level of 0.2 to 0.3 KW in the lower side of the low horizontal reservoir 112b is operated to heat water by a predetermined temperature set in the control box 102 in connection with a water temperature sensor 131, Herein, the heated water is supplied to the heat exchanger 124 through the return hose 142a by the circulation pump 119 to heat air, again. And, the warming water is heated exchanged with the air, dropped down a little bit at its temperature and then supplied to the humidification water tank 130 through the supply hose 142b. At the same time, the humidification module 118 is operated to provide a sufficient humidification amount of a predetermined humidity set at a user's desire, and the water is moved to the high vertical reservoir 112b and collected to the water tank 112 to be re-circulated.

At that time, the water temperature in the high vertical reservoir 112b is detected by the water temperature sensor 131. The control portion controls the operation of the sheath heater 115 based on the water temperature information of the water temperature sensor 131 to maintain the water in the high vertical reservoir 112b at a predetermined temperature, thereby promoting the energy reduction.

When used in winter, an exterior air is introduced through the air inlet 125 and the air filter 111 into air passages formed in the center and upper portion of the high vertical reservoir 112b by the fan 103. The air is first raised at the temperature through the matrix structure 113 heat-transferred with the warming water heated by the operation of the sheath heater 115.

Again, the air is second heat-exchanged passing through the heat exchanged 124 to raise its temperature, thereby enabling the supply of the warming wind to the indoor, while the vapor generated by the warming water in the high vertical reservoir 112b is supplied with a relatively lighter specific gravity to the indoor for a humidification through the water tank ventilator 132 of the high vertical reservoir 112b, the air outlet 126 on the front surface of the main body 101 and the humidification outlet 133 on the upper portion of the humidification water tank 130.

Accordingly, a real humidification is made through the humidification outlet 133 that is an opening of the water tank cover 112c on the upper portion of the high vertical reservoir 112b in a manner that the ultrasonic humidification module 118 is operated in the warming water supplied to the humidification water tank 130. Specially, the indoor temperature/humidity sensor 129 attached on the front upper portion of the main body 101 enables the warming wind humidification based on a predetermined temperature and humidity previously set in the control box 102 closely connected therewith at a user's desire.

Based on the switch selection of the control box 102 in spring or autumn, the warming water by the operation of the sheath heater 115 in the humidification water tank 112 is supplied to the humidification water tank 130 by the circulation pump 119. The warming water allows the ultrasonic humidification module 118 to be efficiently operated in its function of humidifiers, in which the water in the water tank 112 is heated at 85° C. by the sheath heater 115 to sterilize almost all bacteria, thereby enabling the sanitary cleanliness.

Furthermore, the energy-saved smart safety cooling/warming wind apparatus 100 for the four seasons can realizes a fully humidification automation to enable the supply of a sufficient humidification amount from the humidification outlet 133 in a manner that the humidification module 118 generates vapor in the humidification water tank 130 that is mounted in the upper portion of the water tank 112, and an humidification amount at a user's desire is supplied from the humidification outlet 133 based on the operation of the humidity sensor 129b of the temperature/humidity sensor 129 in connection with a predetermined humidification previously set in the control box 102.

On the other hand, an injection hole cap 127 having a circular male screw at its lower is coupled to a cold storage material member 116 having a circular female screw at its upper with their male and female screws engaged with each other. In order to produce much more cooling water, the cold storage material member 116 having a circular female screw is coupled in a vertical arrangement to additional lower cold storage material member 116 having a circular male screw with their male and female screws driven to each other, thereby increasing the number of the cold storage material member and facilitating their coupling and separating.

There are mounted the waterspout cap 143 on the humidification water tank inlet 141, the particle separation membrane 117 on the water tank ventilator 132, the humidification outlet 133, the dehumidification water tank ventilator 140, etc., and the gasket ring or the gasket 137 and the rubber or the rubber ring 128 for the prevention of the water leakage upon collecting and supplying water on the water tank 112, the humidification water tank 130, the matrix dehumidification water tank 157, etc., thereby preventing the incoming of an alien substance there into and the overflowing outside upon the overturning of the main body 101.

Herein the particle separation membrane 117 has the density of 850 to 950 kg/m$^3$. If the particle separation membrane 117 is mounted on the positions as described above with a most preferable density of 900 kg/m$^3$ thereof, thereby cutting off the leakage of the water, due to it that a density of water is very great over that of the particle separation membrane 117 in light of a water density of 998.2 kg/m$^3$ and an air density of 1,204 kg/m$^3$ at 20° C.

It is known from other example that the particle separation 117 passes a gasoline having a density of 680.3 kg/m$^3$ there through at 20° C., but makes the penetration of the water difficult.

The conventional cooling/warming wind apparatus causes a problem in that the water in the water tank is overflowed in case of the overturning of the main body due to the exterior impact and a user's carelessness, thereby causing the damage of a wooden floor. In contrast to this apparatus, the energy-saved smart safety cooling/warming wind apparatus 100 for the four seasons according to the invention can be considered as a technology to resolve the problem of a prior art, entirely.

As described above, the energy-saved smart safety cooling/warming wind apparatus 100 for the four seasons must be interpreted as the technical elements of the highest wide range. Any ordinary person belonging to this technical field can easily change the material, size, etc., of each component of the invention according to the adaption fields.

Specific embodiments described above may adapts a configuration not known even if they are combined to one another and replaced and easily changed or varied, but it also shall not be escaped out of the scope of the invention.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. An energy-saved smart safety cooling and warming wind apparatus for the four seasons comprising:
   a main body;

an indoor temperature and humidity sensor mounted on the main body;

a water tank mounted in the main body and including a low horizontal reservoir and a high vertical reservoir;

a plurality of cold storage material members mounted in the water tank;

a control box connected with the indoor temperature and humidity sensor to be related to a predetermined temperature and humidity previously set on an indication window and connected to a water temperature sensor and a sheath heater mounted in the water tank;

a matrix structure mounted in the water tank;

a fan and a fan driving motor mounted in the main body; and, an air duct mounted in the main body to discharge an air flow generated by the fan out of the main body.

2. The energy-saved smart safety cooling and warming wind apparatus for the four seasons of claim 1, further comprising:
   a matrix dehumidification water tank mounted in the water tank; and,
   a dehumidification water tank provided on a lower portion of the water tank to collect the whole quantity of water flowing along the surface of the water tank due to the dehumidification and dewing condensation phenomena in summer.

3. The energy-saved smart safety cooling and warming wind apparatus for the four seasons of claim 1, further comprising an overheating prevention sensor provided on an inner surface of an fan driving motor in the main body to be operated in connection with the control box, thereby preventing the overheating of the fan driving motor.

4. The energy-saved smart safety cooling and warming wind apparatus for the four seasons of claim 1, wherein the cold storage material members are mounted in the water tank so as to be combined in a continuous arrangement with one another for increasing a cooling capacity/heat exchange amount in summer.

5. The energy-saved smart safety cooling and warming wind apparatus for the four seasons of claim 1, further comprising a heat exchanger mounted in the air duct.

6. The energy-saved smart safety cooling and warming wind apparatus for the four seasons of claim 1, further comprising an ultrasonic humidification module for an exclusive humidification mounted in the water tank.

7. The energy-saved smart safety cooling and warming wind apparatus for the four seasons of claim 2, wherein the matrix structure mounted in the matrix dehumidification water tank comprises:
   (i) a plurality of perforated plates between coupling plates of both sides thereon, wherein the perforated plates comprise a plurality of holes perforated to move air there through and wherein the perforated plates are spaced away in a distance from one another, and
   (ii) a plurality of rectangular space bars alternatively assembled between the perforated plates to be in direct contact with a cooling capacity/heat exchange in the water tank, wherein a plurality of holes are perforated on the rectangular space bars to move water condensed by the cooling capacity/heat exchange of the cold storage material members.

8. The energy-saved smart safety cooling and warming wind apparatus for the four seasons of claim 2, wherein the water tank comprises an opening portion for the matrix structure mounted in the water tank.

9. The energy-saved smart safety cooling and warming wind apparatus for the four seasons of claim 2, further comprising:
   a water tank cover mounted in the water tank, which enables parts to be assembled and disassembled; and,
   a dehumidification water tank cover mounted in the dehumidification water tank, which enables the assembly and disassembly of components.

10. The energy-saved smart safety cooling and warming wind apparatus for the four seasons of claim 1, further comprising:
    particle separation membranes each provided on a water tank ventilator, and
    a humidification outlet and a dehumidification water tank ventilator in the main body.

11. The energy-saved smart safety cooling and warming wind apparatus for the four seasons of claim 2, further comprising:
    particle separation membranes each provided on a water tank ventilator, and
    a humidification outlet and a dehumidification water tank ventilator in the main body.

12. The energy-saved smart safety cooling and warming wind apparatus for the four seasons of claim 2, further comprising a dehumidification water tank cover positioned on the lower portion of the water tank and having a cross-section larger than that of the lower portion of the water tank, the upper surface of which is enlarged around a rectangular circumference for the use of a waterspout.

13. The energy-saved smart safety cooling and warming wind apparatus for the four seasons of claim 2, further comprising a water tank outlet and a dehumidification water tank outlet respectively in the water tank and the dehumidification water tank, which are projected out of an opening portion of the main body.

14. The energy-saved smart safety cooling and warming wind apparatus for the four seasons of claim 2, further comprising:
    first high and low water level gauges mounted in the water tank; and,
    a second high water level gauge mounted in the dehumidification water tank.

15. The energy-saved smart safety cooling and warming wind apparatus for the four seasons of claim 2, further comprising a water spout cap mounted at a dehumidification water tank inlet in the dehumidification water tank and including an enlarged surface of a lower portion thereof to serve as a check valve for preventing the leakage of water.

* * * * *